(12) United States Patent
Shekhawat et al.

(10) Patent No.: US 7,518,895 B2
(45) Date of Patent: Apr. 14, 2009

(54) HIGH-EFFICIENCY POWER CONVERTER SYSTEM

(75) Inventors: Sampat Shekhawat, Mountaintop, PA (US); Ronald H. Randall, Cuba, NY (US); Donghye Cho, Seoul (KR)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 11/480,004

(22) Filed: Jun. 30, 2006

(65) Prior Publication Data
US 2008/0002444 A1    Jan. 3, 2008

(51) Int. Cl.
*H02M 7/219* (2006.01)
(52) U.S. Cl. .............................. 363/89; 363/88; 363/127
(58) Field of Classification Search .................. 363/70, 363/84, 89, 125, 126, 127, 52, 53, 88; 323/222, 323/223, 225, 229
See application file for complete search history.

(56) References Cited

U.S. PATENT DOCUMENTS

| | | | |
|---|---|---|---|
| 5,633,793 A * | 5/1997 | Lee et al. ..................... | 363/127 |
| 6,570,366 B1 * | 5/2003 | Lin et al. ..................... | 323/207 |
| 6,611,130 B2 * | 8/2003 | Chang ........................ | 323/235 |
| 6,738,274 B2 | 5/2004 | Prasad et al. | |
| 2006/0198172 A1 | 9/2006 | Wood | |

OTHER PUBLICATIONS

Datasheet—Application Note 42032, FAN4822, "Power Factor Correction with Zero Voltage Resonant Switching," Rev. 1.0.2, Oct. 10, 2001, 12 pgs.
C.M. Wang, "ZCS-PWM Boost Rectifier with High Power Factor and Low Conduction Losses," IEEE Transactions on Aerospace and Electronic Systems, vol. 40, No. 2, Apr. 2004, pp. 650-660.
B. Lu et al., "Bridgeless PFC Implementation Using One Cycle Control Technique," International Rectifier, APEC 2005, 6 pgs.
G. Hua et al., "Novel Zero-Current-Transistion PWM Converter," IEEE, 1993, pp. 538-544.

* cited by examiner

*Primary Examiner*—Gary L Laxton
(74) *Attorney, Agent, or Firm*—Sidley Austin LLP

(57) ABSTRACT

In one embodiment, a power converter system includes a first input terminal and a second input terminal operable to connect to an alternating current (AC) power source, and an output terminal at which an output voltage can be provided to a load. A first inductor and a first diode are connected in series between the first input terminal and the output terminal. A second inductor and a second diode are connected in series between the second input terminal and the output terminal. A first switch is connected to the first inductor and the first diode, and a second switch is connected to the second inductor and the second diode. The first switch and the second switch alternately function as a boost switch and a synchronous rectifier for charging and discharging the first and second inductors during operation of the power converter system. An auxiliary network is operable to provide for zero voltage switching (ZVS) and zero current switching (ZCS) conditions for both the first and second switches during operation of the power converter system.

13 Claims, 10 Drawing Sheets

HIGH-EFFICIENCY POWER CONVERTER SYSTEM

BACKGROUND

1. Field of Invention

The present invention relates to power conversion, and more particularly, to a high-efficiency power converter system.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Substantial losses may occur when such switches are turned on and off under certain conditions. Losses may also occur in a power converter due to the flow of current through various circuit components (e.g., diodes) which have an associated forward conduction power loss. It is desirable to reduce or minimize such losses. Furthermore, various government regulatory agencies have mandated the use of power factor correction (PFC) in order to meet standards (e.g., EN61000-3-2 harmonics control) in some applications.

SUMMARY

According to an embodiment of the present invention, a power converter system includes a first input terminal and a second input terminal operable to connect to an alternating current (AC) power source, and an output terminal at which an output voltage can be provided to a load. A first inductor and a first diode are connected in series between the first input terminal and the output terminal. A second inductor and a second diode are connected in series between the second input terminal and the output terminal. A first switch is connected to the first inductor and the first diode, and a second switch is connected to the second inductor and the second diode. The first switch and the second switch alternately function as a boost switch and a synchronous rectifier for charging and discharging the first and second inductors during operation of the power converter system. An auxiliary network is operable to provide for zero voltage switching (ZVS) and zero current switching (ZCS) conditions for both the first and second switches during operation of the power converter system.

According to another embodiment of the present invention, a power converter system includes a first input terminal operable to connect to one end of an alternating current (AC) power source and a second input terminal operable to connect to another end of the AC power source. An output voltage can be provided to a load at an output terminal. A first boost inductor and a first boost diode are connected in series between the first input terminal and the output terminal. A second boost inductor and a second boost diode are connected in series between the second input terminal and the output terminal. A first switch is operable to function as a boost switch to charge and discharge the first boost inductor during a first half cycle of the AC power source. A second switch is operable to function as a boost switch to charge and discharge the second boost inductor during a second half cycle of the AC power source. An auxiliary network is operable to provide for zero voltage switching (ZVS) and zero current switching (ZCS) conditions for both the first and second switches during the first half cycle and the second half cycle, respectively, of the AC power source.

According to yet another embodiment of the present invention, a power converter system includes a first input terminal and a second input terminal operable to connect to an alternating current (AC) power source, and an output terminal at which an output voltage can be provided to a load. A first inductor and a first diode are connected in series between the first input terminal and the output terminal. A second inductor and a second diode are connected in series between the second input terminal and the output terminal. A first switch is connected to the first inductor and the first diode, and a second switch is connected to the second inductor and the second diode. The first switch and the second switch alternately function as a boost switch and a synchronous rectifier for charging and discharging the first and second inductors during operation of the power converter system. The power converter system includes means for providing for zero voltage switching (ZVS) and zero current switching (ZCS) conditions for both the first and second switches during operation of the power converter system.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 14 of the drawings. Like numerals are used for like and corresponding parts of the various drawings.

In one embodiment, an AC-to-DC power converter system is provided which integrates input side rectification and soft-switched power factor correction (PFC). For soft-switched PFC, various switches in the power converter system are turned on and off under zero voltage switching (ZVS) and/or zero current switching (ZCS) conditions. The converter system may be capable of true synchronous rectification. The power converter system may include circuitry for input side rectification, boost, and soft-switched PFC.

Furthermore, in some embodiments, the present invention increases converter efficiency by reducing conduction losses as well as switching losses. In some embodiments, this reduces heat sink size as well as increases power density.

Figure 1:
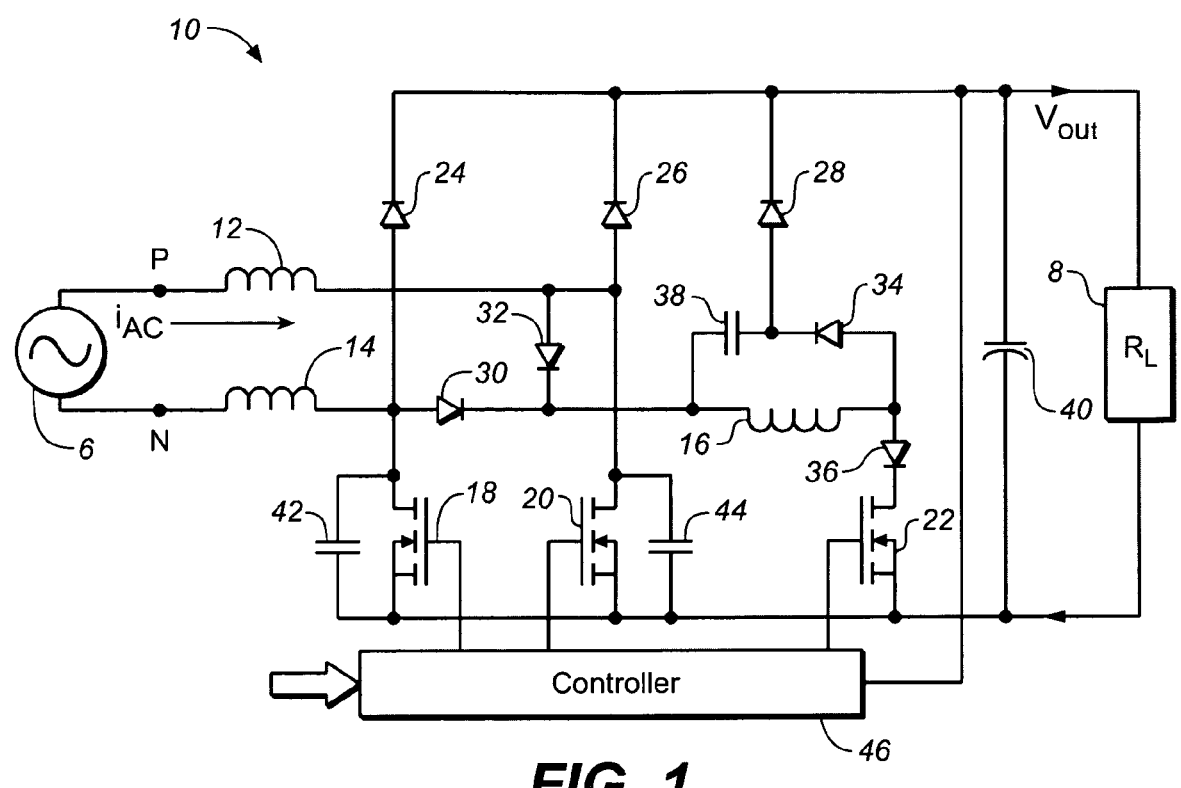
FIG. 1 is a schematic diagram of an implementation of a power converter system, according to an embodiment of the invention.

FIG. 1 is a schematic diagram of an implementation of a power converter system 10, according to an embodiment of the invention. Power converter system 10 can convert an alternating current (AC) power to direct current (DC) power, and thus, is an AC/DC converter. Power converter 10 receives the AC power from an AC power source 6 at an input having a first terminal (P) and a second terminal (N). The power converter system 10 delivers boosted DC power to a load 8 at an output terminal Vout. The power converter system 10 may have higher efficiency than previous designs, because both conduction losses as well as switching losses are reduced in system 10.

For typical applications AC power source 6 can have a range from 85 volts rms to 264 volts rms, and operate at a frequency in the range from 50 to 60 Hz. For these typical AC input conditions the Vout voltage will be, for example, 390Vdc. In some embodiment, power converter system 10 can have circuitry for power factor correction (PFC) for the AC, as shown and described with reference to FIGS. 11-14 below.

As shown, power converter system 10 includes inductors 12, 14, 16, switches 18, 20, 22, diodes 24, 26, 28, 30, 32, 34, 36, capacitors 38, 40, 42, 44, and controller 46. Switches 18, 20, 22 may each be implemented as a metal-oxide-semiconductor field effect transistor (MOSFET), but it is understood that these transistor can be implemented with other suitable devices such as, for example, insulated gate bipolar transistors (IGBTs), insulated gate field effect transistors (IGFETs), bipolar junction transistors (BJTs), etc. MOSFET implementations for switches 18, 20 allow them to function as synchronous rectifiers since a MOSFET channel can carry current in the same direction as its body diode. That is, for synchronous rectification, the MOSFET channel and its body diode both carry current so conduction loss are reduced and the efficiency is increased. Capacitors 42 and 44 in parallel with switches 18 and 20 may represent Coss, the parasitic drain source capacitance of 18 and 20 and/or additional capacitance placed in parallel with 18 and 20 to limit the switching rise and fall dv/dt. Controller 46, which may be implemented in any suitable logic, provides control signals for turning on and turning off switches 18, 20, and 22. In one embodiment, circuitry (not explicitly shown) may be provided in power converter system 10 to allow controller 46 to sense the drain-to-source voltage (Vds) across the switches 18 and 20 so that controller can drive the switches in response to near zero drain-to-source voltage to achieve ZVS operation of 18 and 20.

In some embodiments, all or a portion of the components of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals there between.

The inductors 12, 14, diodes 24, 26, switches 18, 20, and capacitor 40 may implement the circuitry for the input side rectification as well as the boost function. During the AC mains half cycle when the voltage at the P terminal is positive, switch 18 is continuously turned on and switch 20 acts as a boost switch. When switch 20 is turned on, the absolute value of the mains voltage 6 is applied to the series combination of inductors 12 and 14, thus charging the inductors to some energy level. This is called charging cycle. When switch 20 is turned off, the inductors 12 and 14 discharge through diode 26, the parallel combination of load 8 and capacitor 40, switch 18, and the AC source. This is called discharging cycle. Switch 18 thus provides a return path for the input current back to the N terminal, thereby functioning as a synchronous rectifier during this input half cycle when the voltage at the P terminal is positive. The energy transferred to capacitor 40 during the discharging period is energy from boost inductors 12 and 14 plus energy flowing from the AC mains 6 during this period. During the alternate half cycle when the voltage at the N terminal is positive, the roles of switches 18 and 20 are reversed. Switch 20 is continuously turned on and switch 18 acts as a boost switch. When switch 18 is turned on, the absolute value of the mains voltage is applied to inductor 14, thus charging the inductor. When switch 18 is turned off, the inductors 12 and 14 discharge through diode 24, load 8, capacitor 40, and switch 20. Switch 20 thus provides a return path for the input current back to the P terminal, thereby functioning as a synchronous rectifier during this input half cycle when the voltage at the N terminal is positive. Capacitor 40 functions as an output filter capacitor.

Diodes 28, 30, 32, 34, 36, capacitor 38, inductor 16 and switch 22 form an auxiliary switching network. This auxiliary switching network provides for turn-on of the main boost switches 18, 20 under zero voltage switching (ZVS) and zero current switching (ZCS) conditions, and also provides for turn-off of the main boost switches 18, 20 under ZVS condition. Furthermore, the switch 22 of the auxiliary switching network is itself operated at near ZVS condition. For ZVS, switching transitions are performed at, or close to, zero voltage across the switches 18 and 20 (i.e., Vds is approximately zero). For ZCS, switching transitions are performed at, or close to, zero current flowing through the switches. ZVS and ZCS conditions on both switching devices eliminates the losses associated with diode reverse recovery current. This greatly reduces switching losses in power converter system 10, thus allowing operation at higher switching frequency. For example, if the auxiliary switching network is not provided, then when switch 18 or 20 is turned on, it would hard switch recover diode 24 or 26, respectively. This would result in a large turn-on switching loss since the diode recovery current would flow through the large bus voltage (e.g., 390V). Thus, the auxiliary switching network results in higher efficiency and a reduction in the boost choke size and cost. The resulting improved circuit commutation softness also reduces the conducted and radiated electromagnetic interference (EMI).

Figure 2:
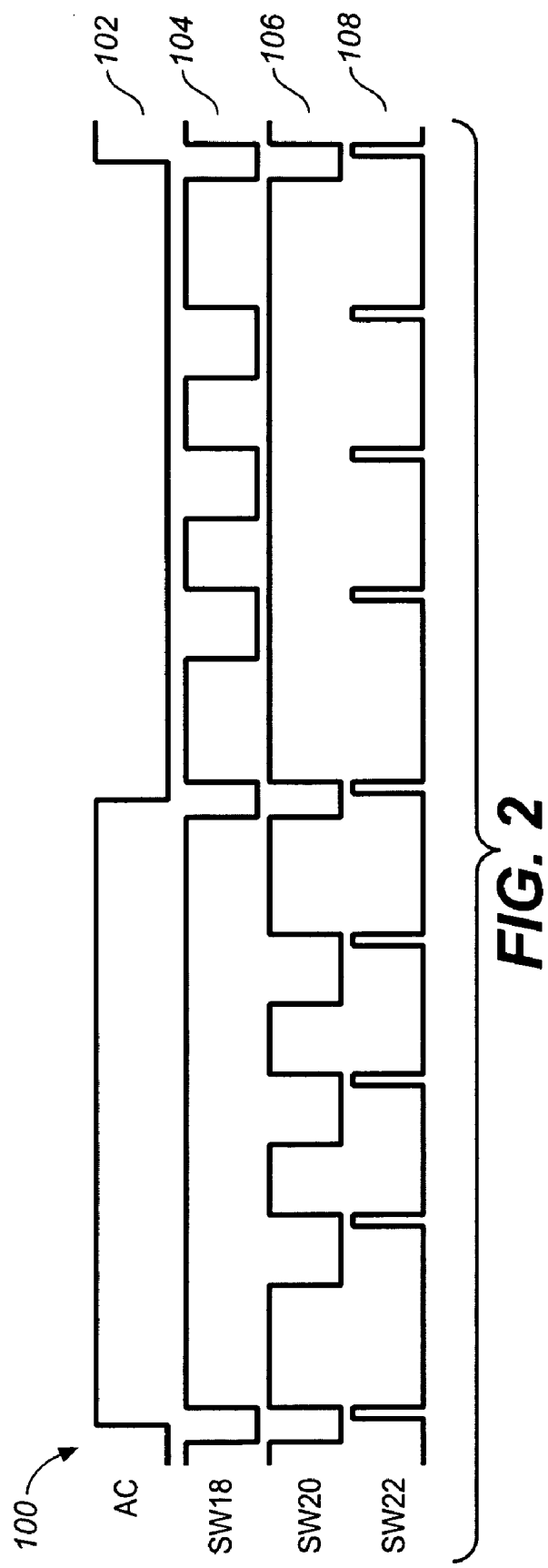
FIG. 2 is an exemplary timing diagram for the implementation of a power converter system shown in FIG. 1, according to an embodiment of the invention.

An exemplary timing diagram 100 for the implementation of the power converter system 10 is shown in FIG. 2. Timing diagram 100 includes a number of waveforms 102, 104, 106, and 108 which generally represent the voltages for the AC mains input and the gates of switches 18, 20, and 22, respectively. In the first half of timing diagram 100 when the P terminal of the AC mains is positive, switch 18 is continuously turned on and switch 20 functions as the boost switch. In the second half of timing diagram 100 when the P terminal of the AC mains is negative, switch 20 is continuously turned on and switch 18 functions as the boost switch. It is understood that the AC mains waveform can be sinusoidal in form.

Now referring to FIGS. 1 and 2, the switch 22 of the auxiliary switching network is turned on before the boost switch 18 or 20 is turned-on. The current through switch 22 will start rising at a di/dt rate of Vout divided by the inductance value of inductor 16, and once the amplitude of this current reaches the amplitude of the current flowing in the boost inductors 12 and 14, the respective boost diode 24 or 26 stops conducting forward current and begins conducting its reverse recovery $Q_{rr}$ charge. Once diode 24 or 26 $Q_{rr}$ reverse recovery current is complete, inductor 16 in the auxiliary switching network will resonant discharge the output capacitor 42 or 44 of the boost switch 18 or 20, respectively, depending on which switch is ready to be turned-on. At the time when capacitor 42 or 44 is discharged to zero volts, the current in inductor 16 will be greater than the current in inductors 12 and 14. This excess current circulates backwards through the parasitic body diode of switch 18 or 20, reversing the voltage across switch 18 or 20 by one diode drop. Now that the voltage across boost switch 18 or 20 is almost zero, this zero voltage condition may be sensed by the controller 46, which then allows the boost switch 18 or 20 to turn-on. In an alternative embodiment, zero voltage switching (ZVS) of switch 18 or 20 can be accomplished by configuring power converter system 10 to have a delay (e.g., 0.5 μs) between the turn on of switch 22 and the turn on of the boost switch 18 or 20. This can be achieved, for example, by making inductor 16 of sufficient size that the resonant quarter cycle of inductor 16 and capacitor 42 or 44 plus the diode recovery time (trr) of diodes 24 or 26 is less than the 0.5 μsec. Thus, the boost switch 18 or 20 turns on at ZVS-ZCS condition. Once zero voltage is sensed, the switch 22 of the auxiliary network is also turned-off when either of the boost switches 18 or 20 is turned on. The energy stored in inductor 16 is then transferred to capacitor 38 charging the capacitor 38 to the Vout potential through diode 34. The charging of capacitor 38 allows current through switch 22 to fall to zero at a very low drain source voltage, and switch 22 turns off at near ZVS condition. Excess energy in inductor 16 (after capacitor 38 is charged to Vout) is then transferred to the output through diodes 30 or 32, 34, and 28. The same boost switch will turn-off at ZVS condition because of its own Coss (the parallel capacitor 42 or 44) and capacitor 38. As current through switch 18 or 20 falls to zero, the AC input current flowing in inductors 12 or 14 will transfer to diodes 30 or 32, respectively. This current flows through capacitor 38 and diode 28, discharging capacitor 38 in preparation for the next switching cycle. The value of capacitor 38 is typically dominant with respect to capacitor 42 or 44 in setting the rate of rise of the drain voltage of switch 18 or 20. This slow rise in voltage reduces the turn-off switching losses of switches 18 and 20 to near zero. As such, all switches 18, 20, and 22 are switched on and off under soft switching conditions. Because of these conditions, the efficiency of power converter system 10 can be increased to about 97%.

Figure 3:
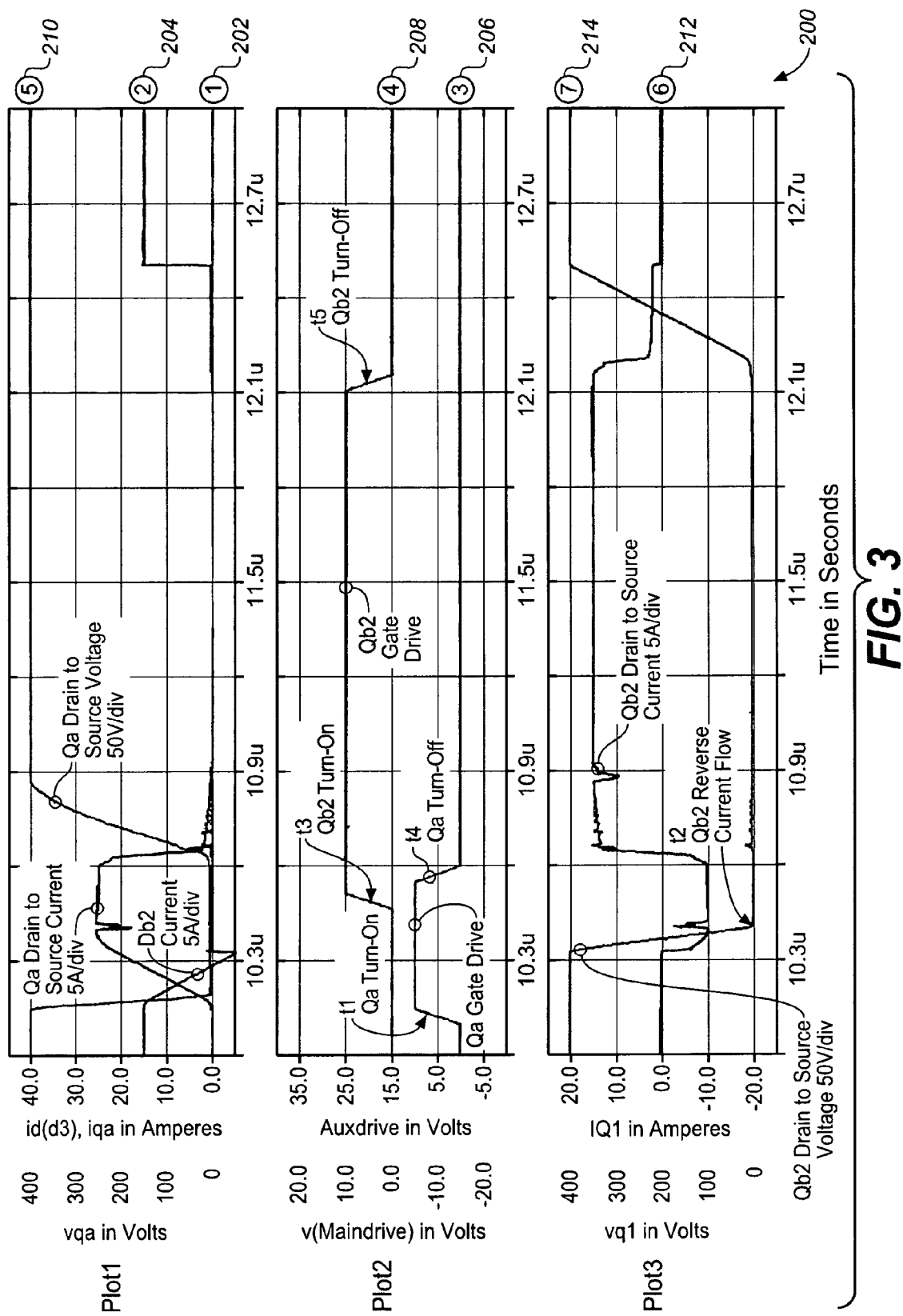
FIG. 3 is an exemplary waveform diagram for a power converter system, according to an embodiment of the invention.

FIG. 3 is an exemplary waveform diagram 200 for power converter system 10, according to an embodiment of the invention. Diagram 200 includes waveform 202 representing the current flowing through switch 22, waveform 204 representing the current flowing through diode 26, waveform 206 representing the gate drive signal for switch 22, waveform 208 representing the gate drive signal for boost switch 20 (or 18), waveform 210 representing the drain-to-source voltage (Vds) of switch 22, waveform 212 representing the current flowing through boost switch 20 (or 18), and waveform 214 representing the Vds of switch 20 (or 18).

Diagram 200 depicts the switching cycle of system 10 during the ½-cycle when the AC mains voltage 6 is positive (+) at the P terminal and negative (−) at the N terminal in FIG. 1. During this time period, switch 18 will be turned on continuously and conducting input current from its source to drain and back into the N terminal. Assume a current iAC is flowing into the P terminal and through diode 26 to the output capacitor 40. If switch 22 is then turned on at time t1 to initiate the beginning of the next charge cycle of boost inductors 12 and 14, the output voltage Vout will be impressed across inductor 16 and its current will rise at a rate $$\frac{di}{dt} = \frac{Vout}{Lr}$$

(where Lr is the value of inductor 16) until it reaches a value equal to the input current iAC plus the peak reverse recovery current ($I_{PRR}$) in the boost diode 26. When the boost diode 26 establishes its reverse blocking capability, inductor 16 will resonate with the output capacitance 44 of boost switch 20, thus discharging the capacitor 44 and placing boost switch 20 in condition for ZVS. At this time, the current in inductor 16 is greater than the AC input current iAC, and the difference current will flow backwards through the body diode of switch 20 at time t2.

Once the drain-to-source voltage (Vds) of switch 20 reaches zero potential, the controller 46 senses this and turns on switch 20 and turns off switch 22. Switch 20 is thus turned on at time t3 under ZVS and ZCS conditions. The energy in inductor 16 then transfers into capacitor 38, charging it to a potential of $V_{Cr} = I_{Lr} \times \sqrt{Lr/Cr}$, where Vcr is the voltage on the capacitor 38, and Ilr is the current flowing in inductor 16. If the energy in inductor 16 is greater than that required to charge the capacitor 38 to Vout, the excess energy will flow to the output capacitor 40. The path for this current flow is through diode 32, inductor 16, diode 34, and diode 28. This turn-off sequence for switch 22 is illustrated starting with time t4 in FIG. 3. Note that the voltage across the capacitor 38 is near zero just prior to switch 22 turning off, thus the current of switch 22 transfers almost immediately to capacitor 38, thus providing ZVS switching for switch 22. Diode 36 prevents the output capacitance of switch 22 from ringing with inductor 16 and capacitor 38, which would discharge capacitor 38. Thus, diode 36 is provided so that capacitor 38 is left fully charged when boost switch 20 is turned off, thereby allowing boost switch 20 to turn off under ZVS conditions.

At time t5, when switch 20 is turned off, thus ending the power factor correction (PFC) charging cycle for switch 20, the AC input current iAC may immediately transfer to diode 32, capacitor 38, and diode 28, flowing directly to the output capacitor 40 and returning through the body diode of switch 18 to the N input terminal. If the inductance/capacitance ratio of inductor 16 and capacitor 38 is suitably set, capacitor 38 will be charged to almost the potential of output capacitor 40 when switch 20 is turned off. Thus, the current in switch 20 will transfer to diode 32 at a very low voltage, thereby accomplishing switching under ZVS condition. The voltage across switch 20 will then rise to the potential of Vout at a rate of dv/dt=iAC/Cr where iAC is the magnitude of the AC input current at that time and Cr is the value of capacitor 38. Referencing waveform 212 in FIG. 3 the small current flowing in switch 20 during the time that its drain to source voltage is rising to Vout is the current required to charge capacitor 44 and switch 20 Coss output capacitance to Vout Once the drain to source voltage (Vds) of switch 20 reaches the potential of Vout, then capacitor 38 Cr will be completely discharged and the AC input current will transfer to the boost diode 26. The power converter system 10 is then ready or preset for the next boost inductor charging cycle.

Note that when switch 22 turns back on to initiate the next charging cycle, the current in inductor 16 is zero. Thus, if switch 22 is turned on sufficiently rapidly, switching will occur under ZCS condition (with minimal turn-on losses).

During the alternate AC mains cycle, when the AC mains voltage 6 is positive (+) at the N terminal and negative (−) at the P terminal, switch 20 will be turned on continuously and switch 18, diode 30, and diode 24 will perform in essentially the manner described and illustrated in FIG. 3.

Figure 4:
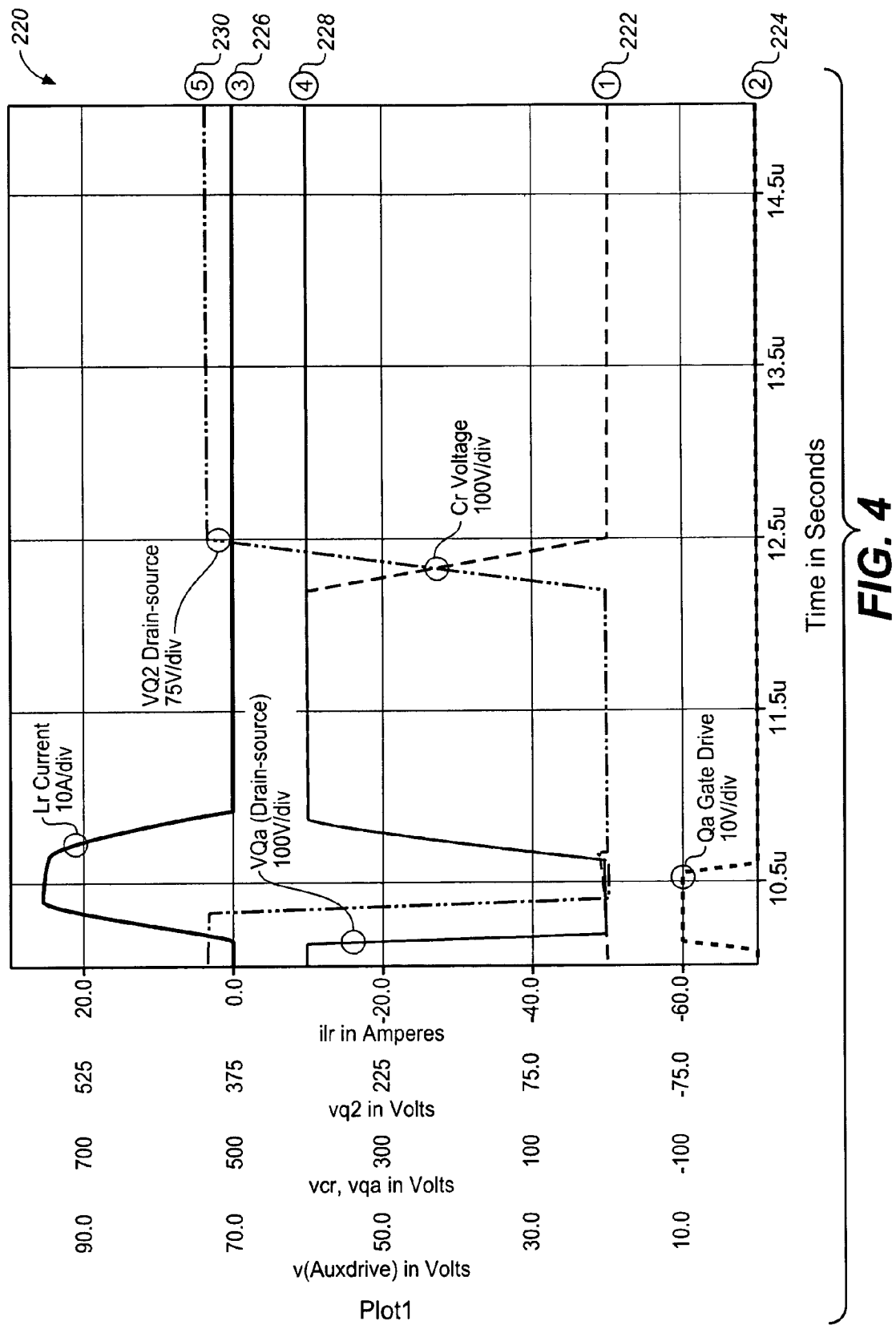
FIGS. 4 through 6 are exemplary waveform diagrams for a power converter system, according to an embodiment of the invention.
Figure 5:
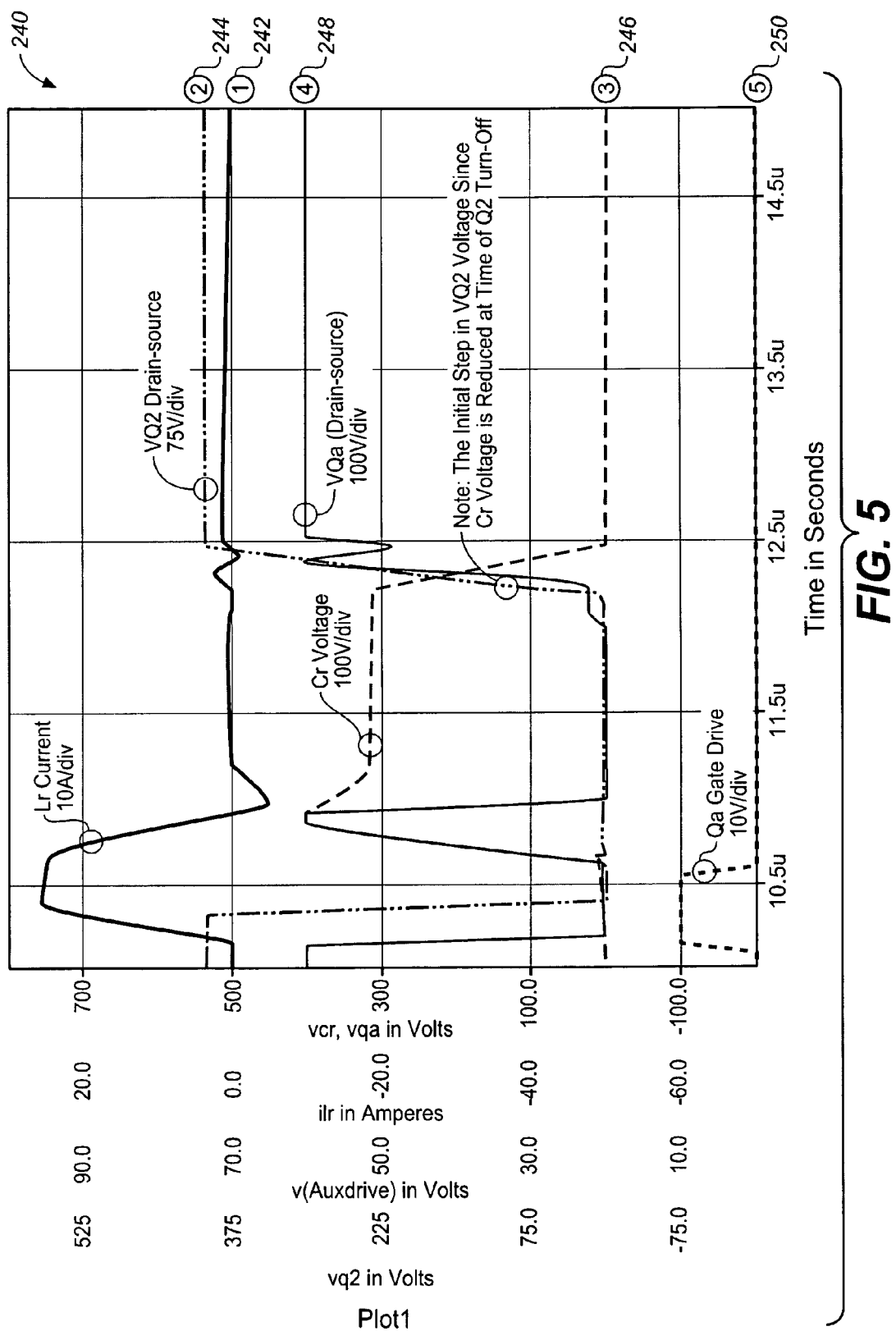
Figure 6:
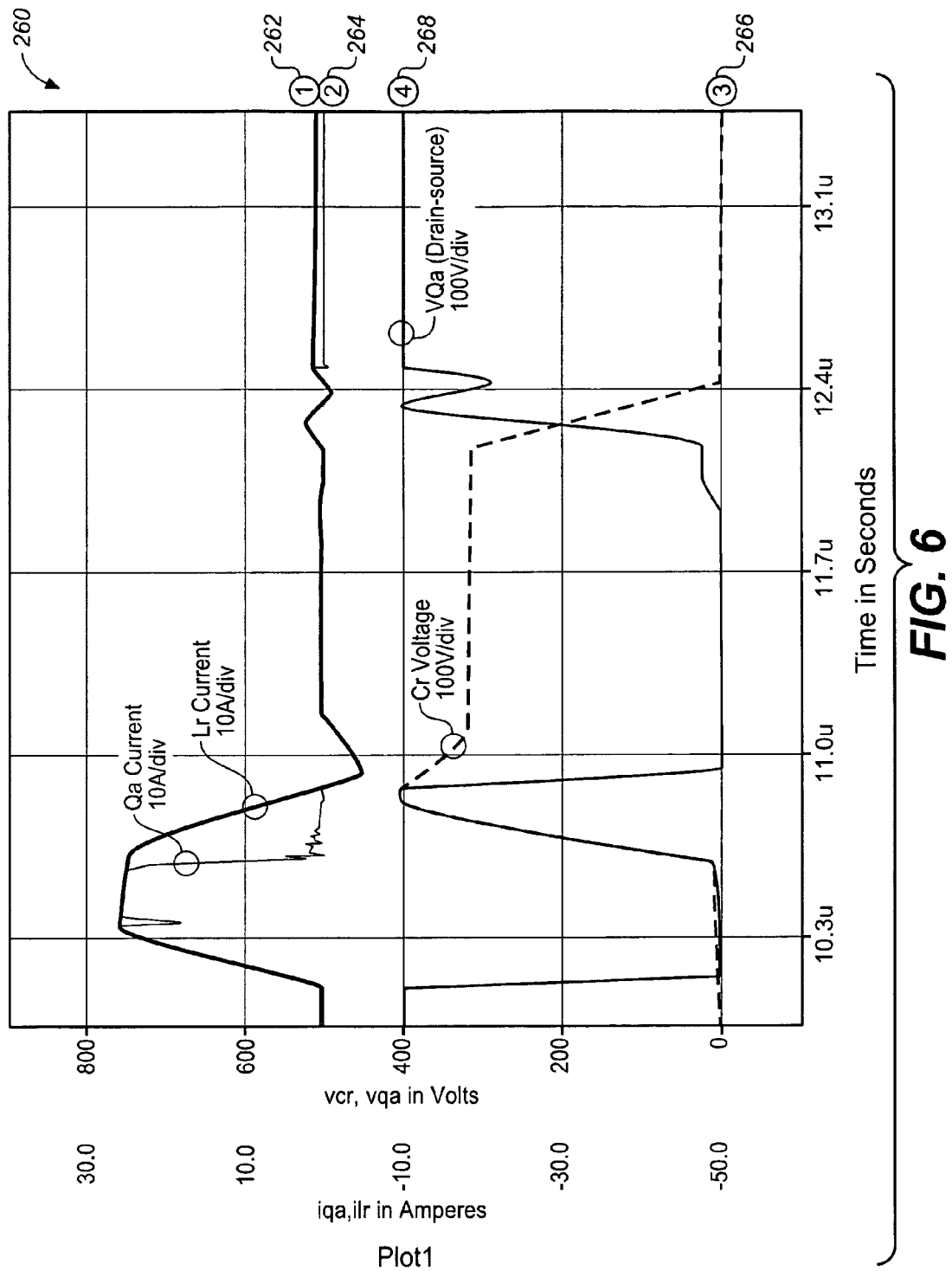

FIGS. 4, 5, and 6 are waveform diagrams which illustrate the impact of diode 36 on the operation of power converter system 10. FIG. 4 is a waveform diagram 220 for the system 10 if diode 36 is provided or included. FIG. 4 includes waveform 222 representing the voltage across capacitor 38, waveform 224 representing the gate drive signal for switch 22, waveform 226 representing the current flowing in inductor 16, waveform 228 representing the drain-to-source voltage (Vds) for switch 22, and waveform 230 representing the Vds for switch 20 (or 18). In FIG. 4, the voltage across capacitor 38 remains near or is close to that across output capacitor 40 at the time when switch 20 is turned off.

FIG. 5 is a waveform diagram 240 for the system 10 if diode 36 is absent or not provided and is replaced by a direct connection between the drain of switch 22 and the node at which inductor 16 is connected to diode 34. FIG. 5 includes waveform 242 representing the current flowing in inductor 16, waveform 244 representing the Vds for switch 20 (or 18), waveform 246 representing the voltage across capacitor 38, waveform 248 representing the drain-to-source voltage (Vds) for switch 22, and waveform 250 representing the gate drive signal for switch 22. In FIG. 5 the output capacitance of switch 22 rings through inductor 16, capacitor 38 and diode 28, thus discharging capacitor 38 to a potential less than the output voltage Vout. This causes an abrupt rise in the voltage of switch 20 when it is turned off, thus increasing its switching losses. In some embodiments, the benefit or advantage provided by diode 36 correlates to the ratio of capacitor 38 to the output capacitance Coss of switch 22. That is, diode 36 provides greater benefits or advantages (e.g., in terms of increasing efficiency) when the output capacitance Coss of switch 22 is larger.

FIG. 6 is exemplary waveform diagram 260 for a power converter system, according to an embodiment of the invention. In particular, FIG. 6 illustrates the switching characteristics of switch 22. FIG. 6 includes waveform 262 representing the current flowing in inductor 16, waveform 264 representing the current flowing through switch 22, waveform 266 representing the voltage across capacitor 38, and waveform 268 representing the drain-to-source voltage (Vds) of switch 22. As shown, switch 22 turns on under zero current switching (ZCS) and turns off at zero voltage. The current in switch 22 during the rise in Vds is not indicative of energy dissipated in switch 22 but is the charge current associated with recharging its Coss output capacitance. Switch 22 can be viewed as a switch in parallel with a capacitance Coss. If this switch is turned off very rapidly, most of the current flowing in switch 22 transfers to charge capacitor 38 through diode 34. A small portion of this current, as seen by the decaying current in switch 22, flows in Coss charging it to Vout potential. Coss is a non linear capacitance (i.e., large when Vds is low, and decreasing with increasing charge potential. That is why the current falls off as Vds increases.

Figure 7:
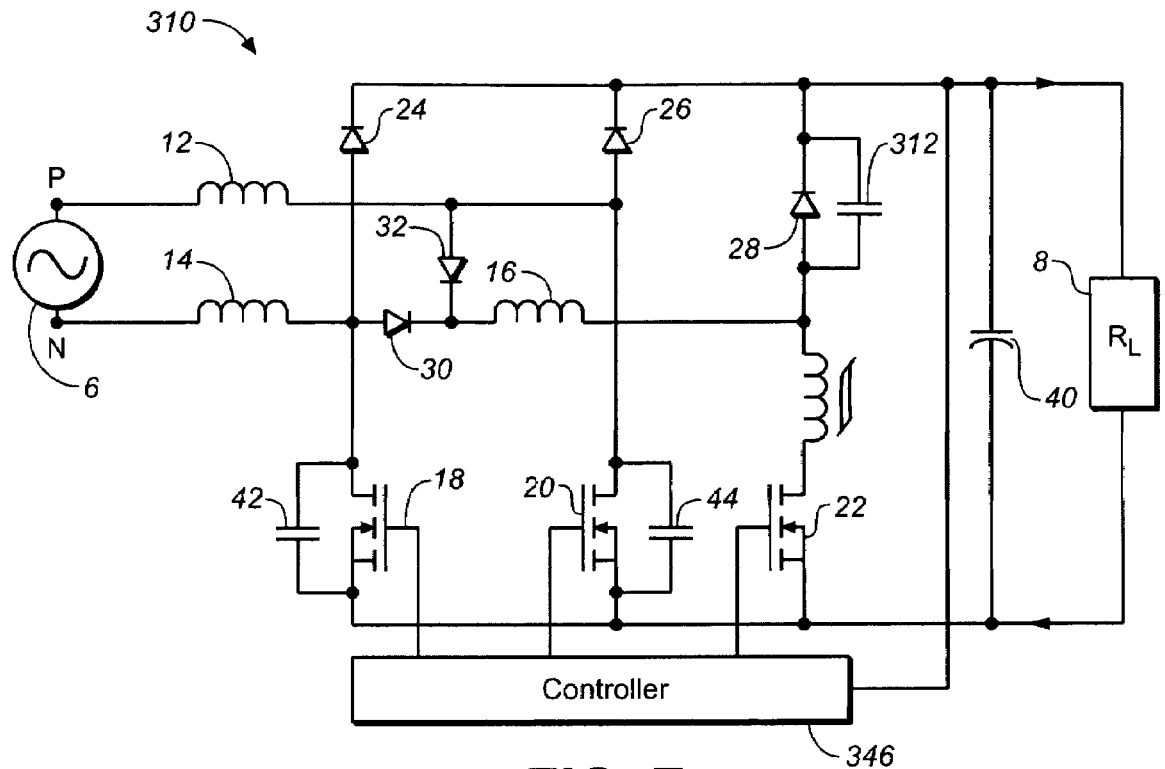
FIG. 7 is a schematic diagram of another implementation of a power converter system, according to an embodiment of the invention.

FIG. 7 is a schematic diagram of another implementation of a power converter system 310, according to an embodiment of the invention. Power converter system 310 converts an AC mains voltage 6 into DC power for delivery to a load 8. Power converter system 310 shown in FIG. 7 is similar to power converter system 10 shown in FIG. 1, and as such, includes inductors 12, 14, 16, switches 18, 20, 22, diodes 24, 26, 28, 30, 32, and capacitors 40, 42, 44. Power converter system 310 also includes a capacitor 312 and a controller 346. The inductors 12, 14, diodes 24, 26, switches 18, 20, and capacitor 40 may implement the circuitry for the input side rectification as well as the boost function. Diodes 28, 30, 32, capacitors 40, 312, inductor 16 and switch 22 may form an auxiliary switching network. This auxiliary switching network provides for turn-on of the main boost switches 18, 20 under zero voltage switching (ZVS) and zero current switching (ZCS) conditions. In particular, the diodes 30 and 32 in power converter system 310 help support or provide switching of boost switches 18 and 20, respectively, under ZVS or ZCS for each half cycle (at fundamental frequency). Furthermore, diodes 30 and 32 help to reduce or eliminate current through diode 28 during steady state to eliminate or reduce recovery current for diode 28 when switch 22 is turned on. Thus, as with power converter system 10, the turn-on of the boost switches 18 and 20 is at ZVS-ZCS conditions.

Figure 8:
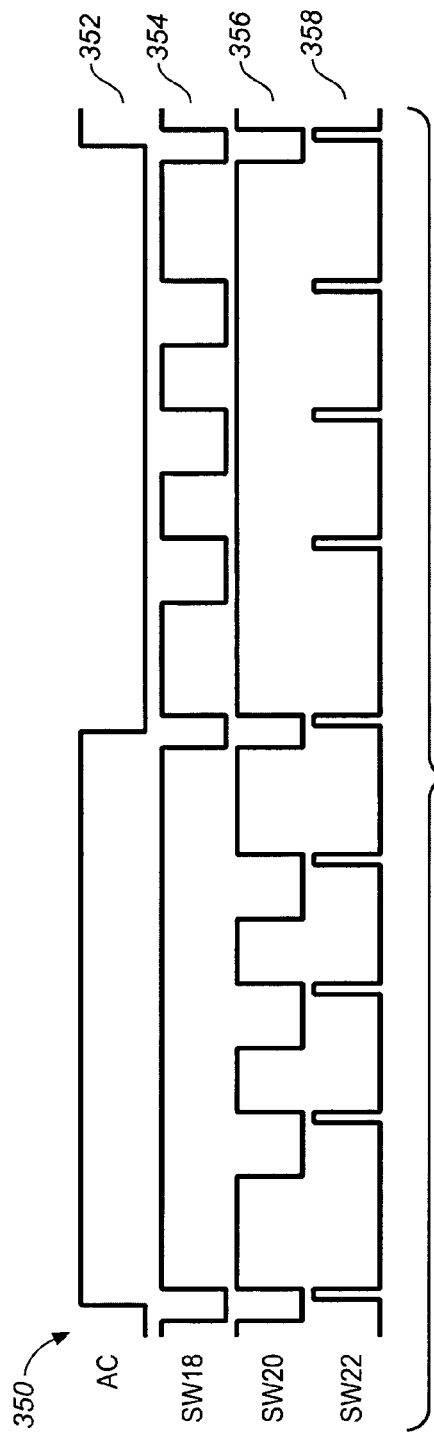
FIG. 8 is an exemplary timing diagram for the implementation of a power converter system shown in FIG. 7, according to an embodiment of the invention.

An exemplary timing diagram 350 for the implementation of the power converter system 310 is shown in FIG. 8. Timing diagram 350 includes a number of waveforms 352, 354, 356, and 358 which generally represent the voltages for the AC mains input and the gates of switches 18, 20, and 22, respectively. It is understood that waveform 352 for the AC mains input could be in the form of a sinusoidal wave. In the first half of timing diagram 350 when the voltage of the AC mains is positive, switch 18 is continuously turned on and switch 20 functions as the boost switch. In the second half of timing diagram 350 when the voltage of the AC mains is negative, switch 20 is continuously turned on and switch 18 functions as the boost switch. Switch 22 is turned on just before the boost switch 18 or 20 is turned on.

Figure 9:
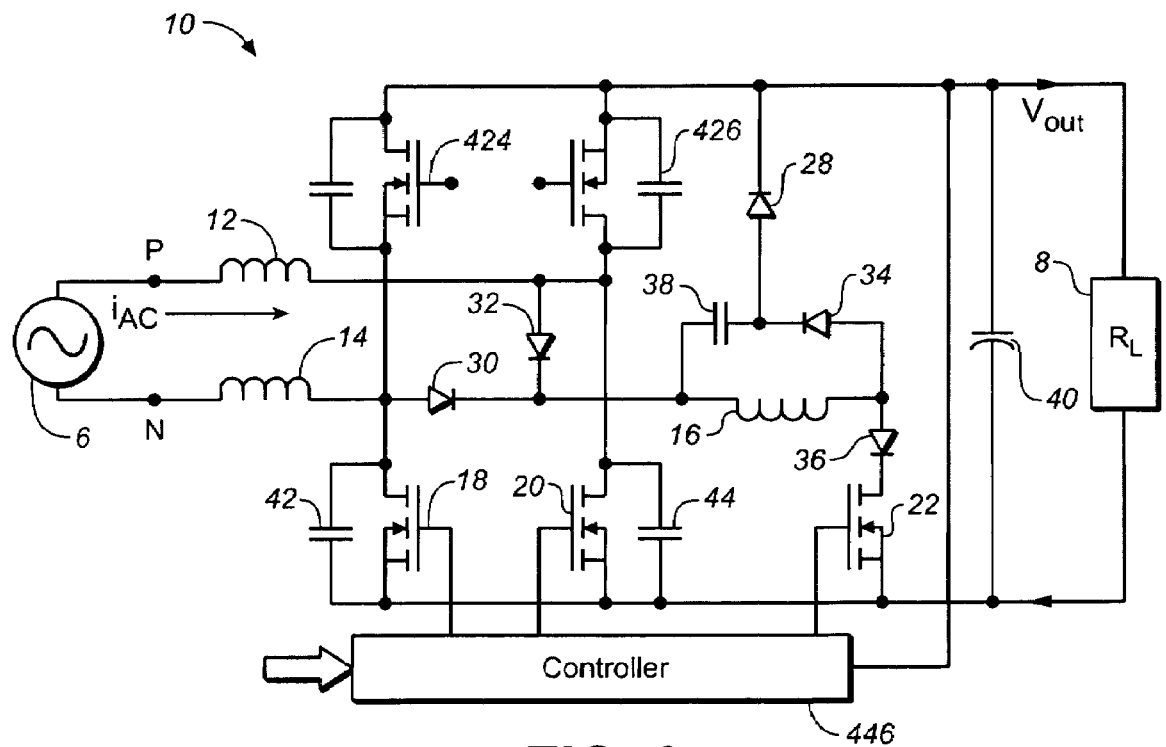
FIG. 9 is a schematic diagram of another implementation of a power converter system, according to an embodiment of the invention.

FIG. 9 is a schematic diagram of another implementation of a power converter system 410, according to an embodiment of the invention. Power converter system 410 converts an AC mains voltage 6 into DC power for delivery to a load 8. Power converter system 410 shown in FIG. 9 is similar to power converter system 10 shown in FIG. 1, and as such, includes inductors 12, 14, 16, switches 18, 20, 22, diodes 28, 30, 32, and capacitors 40, 42, 44. As with power converter system 10, the turn-on of the boost switches 18 and 20 is at ZVS-ZCS conditions. Because of this, power converter system 410 can replace the boost diodes 24 and 26 of converter system 10 with SuperFETs 424 and 426 having fast-body diodes, thus further reducing the conduction losses of the system. Power converter system 110 also includes a controller 446 for controlling the switches 18, 20, 22, 424, and 426.

Figure 10:
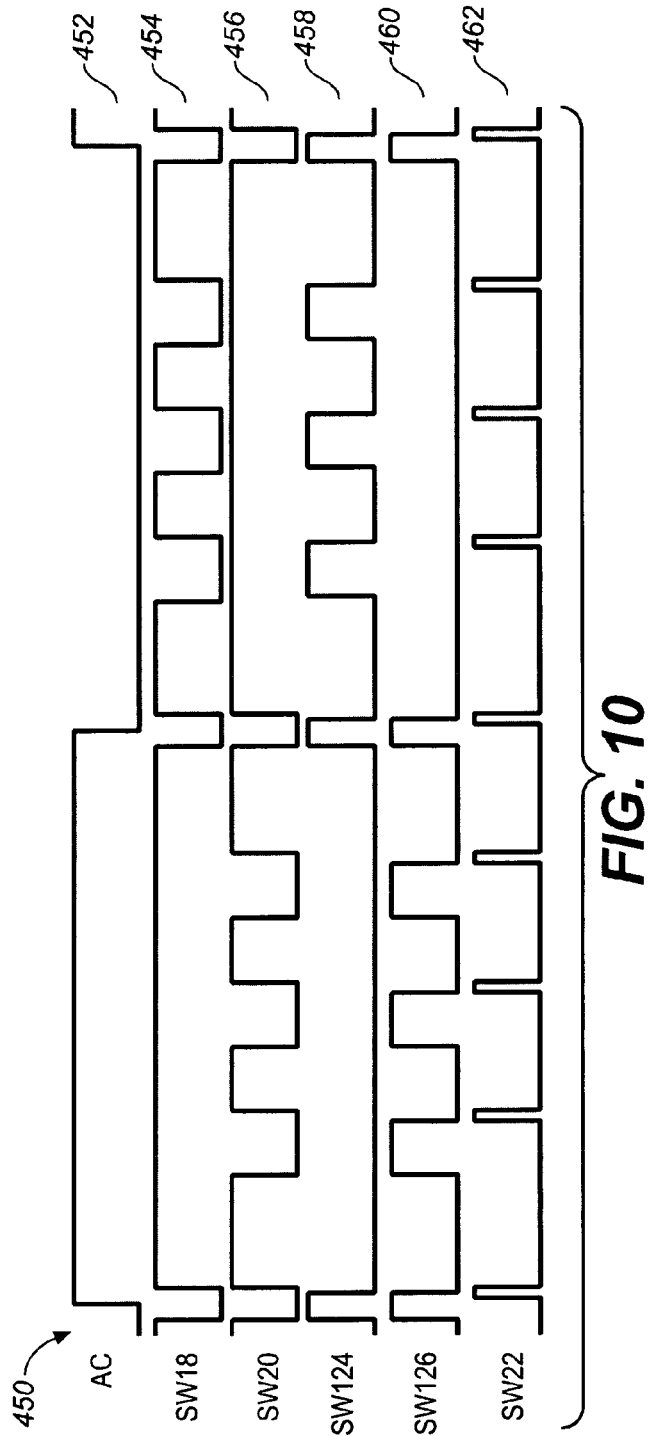
FIG. 10 is an exemplary timing diagram for the implementation of a power converter system shown in FIG. 9, according to an embodiment of the invention.

An exemplary timing diagram 450 for the implementation of the power converter system 410 is shown in FIG. 10. Timing diagram 450 includes a number of waveforms 452, 454, 456, 458, 460, and 462 which generally represent the voltages for the AC mains input and the gates of switches 18, 20, 424, 426, and 22, respectively. In the first half of timing diagram 200 when the voltage of the AC mains is positive on pin (P) and negative on pin (N), switch 18 is continuously turned on, switch 424 is continuously turned off, and switches 20 and 426 function as the boost switches. In the second half of timing diagram 450 when the voltage of the AC mains is negative, switch 20 is continuously turned on, switch 426 is continuously turned off, and switches 18 and 424 function as the boost switches.

Like power converter system 10 of FIG. 1, the power converter systems 310 and 410 shown and described with reference to FIGS. 7 through 10 can provided higher efficiency than previous designs. The various implementations for a power converter system shown and described herein may provide for one or more of the following: turning on one or both of the boost switches at zero voltage switching (ZVS) condition, turning off one or both of the boost switches at ZVS condition, and turning off one or both of the boost switches at zero current switching (ZCS) condition. This reduces switching loss. The electromagnetic interference (EMI) is also reduced. This allows the switching frequency to be increased so as to reduce size of boost choke. Because of these conditions the efficiency of an AC-to-DC converter can be increased to about 97%.

FIGS. 11-14 illustrate waveforms and circuitry for PFC. The power converter system can have or support power factor correction (PFC). In general, PFC reduces high peak current and harmonic currents drawn from the AC input which reduces EMI and produces or supports a cleaner AC line with increased energy potential.

Figure 11:
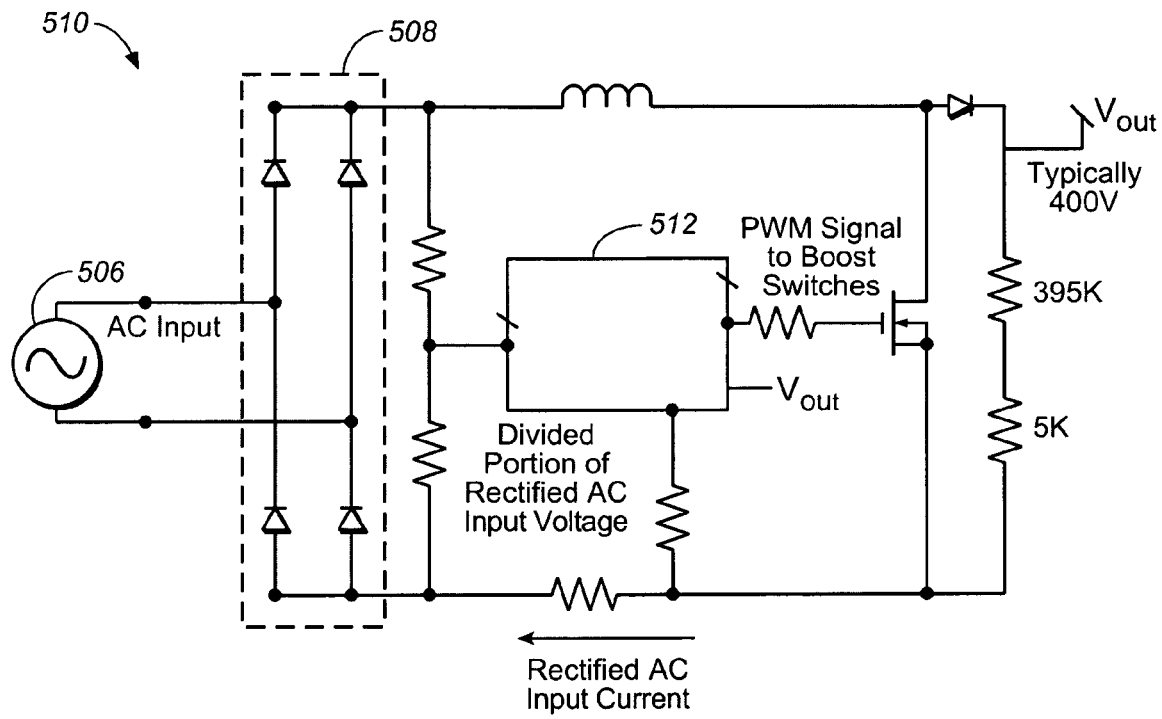
FIG. 11 is a schematic diagram of an implementation of a power converter system with power factor correction (PFC) control, according to an embodiment of the invention.

Referring to FIG. 11, there is shown a power converter system 510 with an active PFC control circuit 512. The power converter system 510 has input terminals for an AC power source 506 and a output terminal Vout. For PFC, the waveform of the current drawn by the power converter system 510 should closely match the voltage waveform of the AC power source 506 (which can be sinusoidal in form). Stated differently, the PFC input current should have a sinusoidal waveform in phase with the voltage of the mains input power source 506.

FIG. 11 illustrates the interface between the active PFC control circuitry 512 and the power circuitry of a conventional boost PFC circuit. If a bridgeless PFC circuit is used, then a common mode isolating circuitry may be required to establish a signal proportional to the rectified AC input but in reference to the ground output. This embodiment of FIG. 11 can be an analog implementation for control circuitry. The same functions may be implemented using digital circuitry such as a digital signal processor (DSP) or microcontroller.

Figure 12:
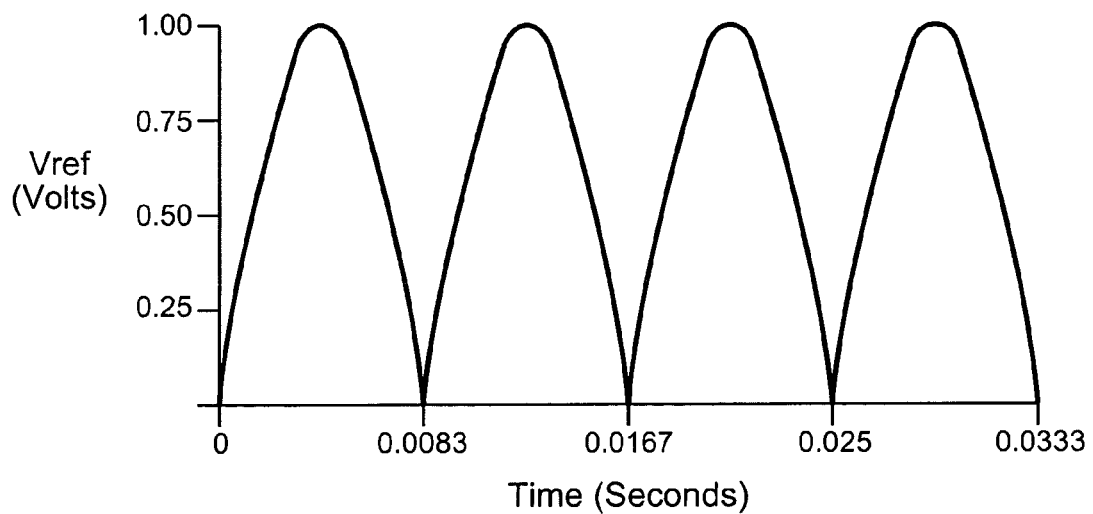
FIG. 12 is an exemplary waveform diagram for a rectified AC input signal, according to an embodiment of the invention.

In power converter system 510, a rectifier circuit 508 rectifies the sinusoidal input to produce a rectified AC input reference signal, for example, as shown in FIG. 12. FIG. 12 illustrates a rectified 60 Hz voltage of 1 volt peak amplitude. The rectified AC input reference signal may be input into active PFC control circuit 512. The active PFC control circuit 512 also has an input for feedback from the output Vout. In one embodiment, the active PFC control circuit 512 comprises a multiplier output regulator loop 514 and a current regulator and PWM circuit 516.

Figure 13:
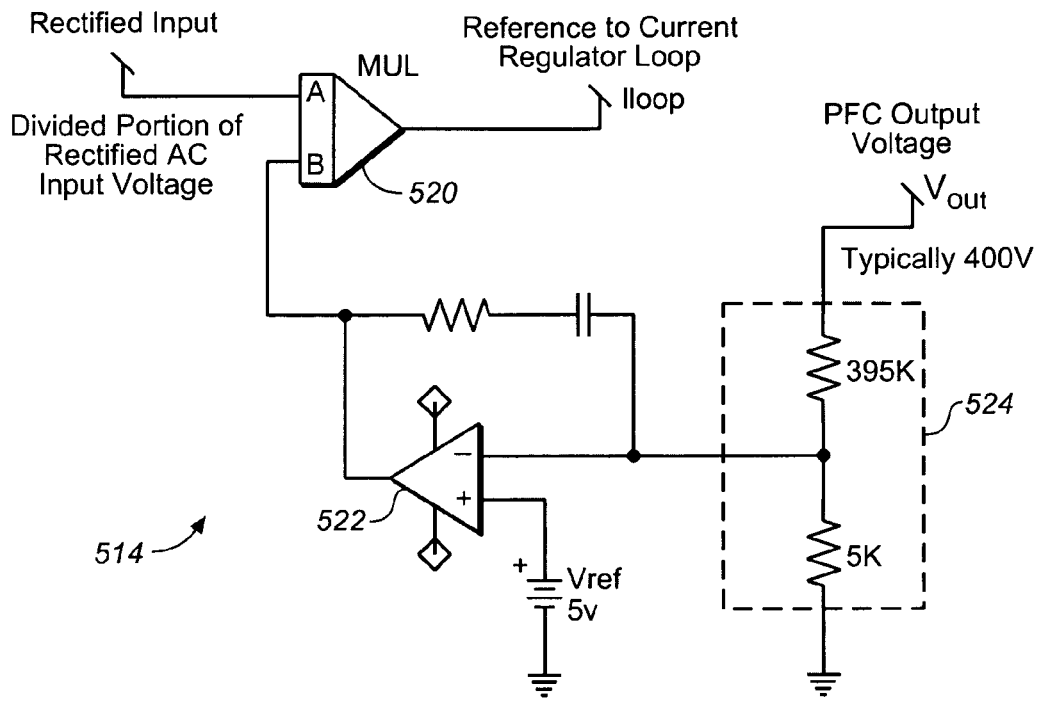
FIG. 13 is a schematic diagram of an implementation of a multiplier and output regulator loop, according to an embodiment of the invention.

FIG. 13 illustrates an exemplary implementation for the multiplier and output regulator loop 514. As shown, the multiplier and output regulator loop 514 comprises a multiplier 520 and an output regulator amplifier 522. The multiplier 520 receives the rectified AC input reference signal of FIG. 12 at a first input (A) and the output from the output regulator amplifier 522 at a second input (B). A resistor divider 524 divides PFC output voltage Vout. The resistor divider 524 may comprise a plurality of resistors (as shown, for example, having values of 395 kΩ and 5 kΩ) which divide the PFC output. The output regulator amplifier 522 receives the divided portion of the PFC output and compares it against a reference voltage, which can have a value of, for example, 5V. If the PFC output voltage is 400V, for example, then resistor divider 524 will provide 5V to the input of output regulator amplifier 522, and the output of amplifier 522 will be held at its value. If the PFC output voltage decreases, then the output of output regulator amplifier 522 will start to increase, thus increasing the value of the input to the multiplier 520. The output of the multiplier 520 is the product of its A and B inputs, and is provided as the reference to current regulator and PWM circuit 516. This input reference to the regulator and PWM circuit 516 will thus be identical in wave shape to the signal shown in FIG. 12 with its amplitude adjusted by the multiplier and output regulator loop 514.

If the PFC output voltage decreases below 400V, the multiplier and output regulator loop 514 will, through operation of its multiplier 520, increase the value of the reference signal provided to the current regulator and PWM circuit 516. Conversely, if the PFC output voltage is greater than 400V, the multiplier and output regulator loop 514 will lower the value of the reference signal provided to the current regulator and PWM circuit 516. In some embodiments, this multiplier and output regulator loop 514 is relatively slow with zero gain crossover frequencies in the range of only several Hz. This can be desirable to prevent output ripple from injecting distortion into the input current through the multiplier 520.

Figure 14:
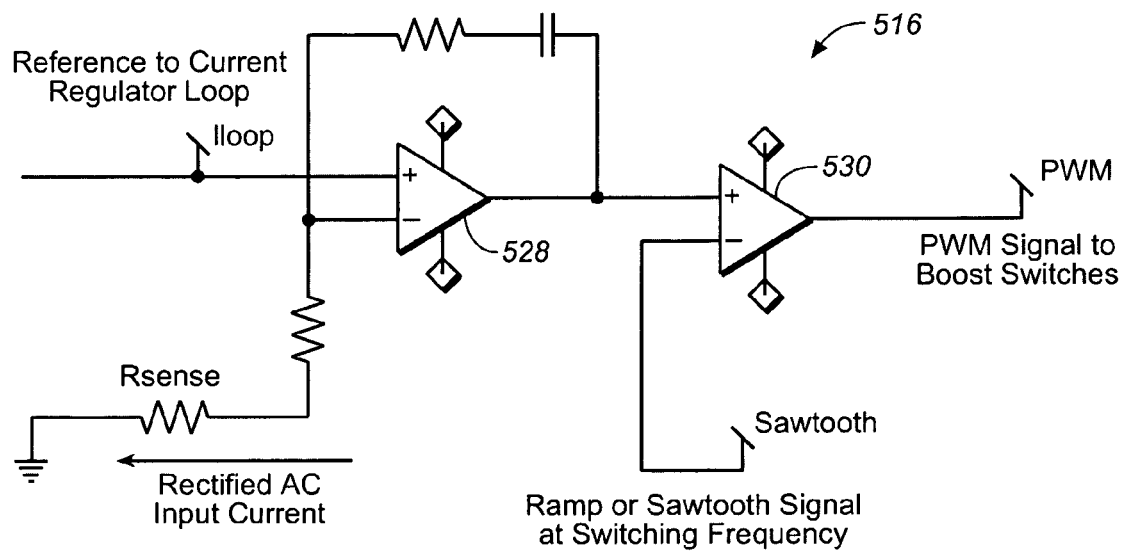
FIG. 14 is a schematic diagram of an implementation of a current regulator and pulse width modulation (PWM) circuit, according to an embodiment of the invention.

FIG. 14 illustrates an exemplary implementation for the current regulator and PWM circuit 516. As shown, the current regulator and PWM circuit 516 includes a current loop amplifier 528 and a PWM comparator 530.

The current loop amplifier 528 receives the output from the multiplier 520 of multiplier and output regulator loop 514 (FIG. 13) and compares it to a signal proportional to the rectified input current. In particular, the output of the multiplier 520 is input to the non-inverting terminal of the current loop amplifier 528. This signal is compared with the signal across a sense resistor (Rsense) which is proportional to the rectified input current. If the Rsense signal is greater than the reference multiplier signal, the output of current loop amplifier 528 will decrease, thereby decreasing the boost switch pulse width. Conversely, if the Rsense signal is less than the output of multiplier 520, the output of current loop amplifier 528 will increase, thereby increasing the boost switch conduction time. The PWM comparator 530 receives the output signal from the current loop amplifier 528 and compares it against a ramp or sawtooth signal at switching frequency. The PWM comparator 530 outputs a PWM signal to the boost switches.

In one embodiment, the current regulator and PWM circuit 516 is capable of relatively fast operation, with its crossover frequency set in the several kilohertz range such that it can force the signal across the Rsense resistor to track the rectified voltage input signal.

In summary for the active PFC control circuit 512, the output voltage is sensed by the multiplier and output regulator loop 514, and the error signal is used to control the amplitude of a voltage to the current regulator and PWM circuit 516. The current regulator and PWM circuit 516 then forces the input current to track the multiplier output signal.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
   a first input terminal and a second input terminal operable to connect to an alternating current (AC) power source;
   an output terminal at which an output voltage can be provided to a load;
   an output capacitor coupled to the output terminal;
   a first inductor and a first diode connected in series between the first input terminal and the output terminal;
   a second inductor and a second diode connected in series between the second input terminal and the output terminal;
   a first switch connected at one end to the first inductor and the first diode, and connected at another end to a power supply rail;
   a second switch connected at one end to the second inductor and the second diode, and connected at another end to the power supply rail;
   wherein the first switch and the second switch alternately function as a boost switch and a synchronous rectifier for charging and discharging the first and second inductors during operation of the power converter system; and
   an auxiliary network operable to provide for zero voltage switching (ZVS) and zero current switching (ZCS) conditions for both the first and second switches during operation of the power converter system;
   wherein the auxiliary network comprises a third switch and an auxiliary capacitor, the third switch connected at one end to the power supply rail, the auxiliary capacitor operable to support ZVS conditions for the third switch during operation of the power converter system.

2. The power converter system of claim 1 wherein the auxiliary network comprises:
   a third inductor connected at one end to the first and second inductors and at another end to the third switch;
   wherein during operation current from the third inductor circulates through the third switch and backwards through a body diode of the first or second switch, thereby reducing the voltage drop across the first or second switch.

3. The power converter system of claim 2 wherein the auxiliary network comprises a capacitor and a third diode connected in parallel to the third inductor.

4. The power converter system of claim 1 wherein the system is implemented on an integrated circuit (IC) device.

5. The power converter system of claim 1 comprising a controller for providing control signals to turn on and off the first and second switches.

6. The power converter system of claim 1 comprising circuitry detecting a zero voltage condition on the first switch or the second switch.

7. The power converter system of claim 1 comprising circuitry for providing power factor correction (PFC) control.

8. A power converter system comprising:
   a first input terminal operable to connect to one end of an alternating current (AC) power source;
   a second input terminal operable to connect to another end of the AC power source;
   an output terminal at which an output voltage can be provided to a load;
   an output capacitor coupled to the output terminal;
   a first boost inductor and a first boost diode connected in series between the first input terminal and the output terminal;
   a second boost inductor and a second boost diode connected in series between the second input terminal and the output terminal;
   a first switch connected at one end to a power supply rail, the first switch operable to function as a boost switch to charge and discharge the first boost inductor during a first half cycle of the AC power source;
   a second switch connected at one end to the power supply rail, the second switch operable to function as a boost switch to charge and discharge the second boost inductor during a second half cycle of the AC power source; and
   an auxiliary network operable to provide for zero voltage switching (ZVS) and zero current switching (ZCS) conditions for both the first and second switches during the first half cycle and the second half cycle, respectively, of the AC power source;
   wherein the auxiliary network comprises a third switch and an auxiliary capacitor, the third switch connected at one end to the power supply rail, the auxiliary capacitor operable to support ZVS conditions for the third switch during operation of the power converter system.

9. The power converter system of claim 8 wherein the auxiliary network comprises:
   a third inductor connected at one end to the first and second inductors and at another end to the third switch;
   wherein during operation current from the third inductor circulates through the third switch and backwards through a body diode of the first or second switch, thereby reducing the voltage drop across the first or second switch.

10. The power converter system of claim 8 wherein the system is implemented on an integrated circuit (IC) device.

11. The power converter system of claim 8 comprising a controller for providing control signals to turn on and off the first and second switches.

12. The power converter system of claim 8 comprising circuitry detecting a zero voltage condition on the first switch or the second switch.

13. The power converter system of claim 8 comprising circuitry for providing power factor correction (PFC) control.

* * * * *